United States Patent
Angelo et al.

(10) Patent No.: US 6,633,978 B1
(45) Date of Patent: Oct. 14, 2003

(54) METHOD AND APPARATUS FOR RESTORING COMPUTER RESOURCES

(75) Inventors: Michael F. Angelo, Houston, TX (US); Sompong P. Olarig, Cypress, TX (US); Thomas J. Bonola, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/540,386

(22) Filed: Mar. 31, 2000

(51) Int. Cl.⁷ .................................................. G06F 1/24
(52) U.S. Cl. ...................................................... 713/100
(58) Field of Search ...................... 713/1, 100; 710/10; 709/220–222

(56) References Cited

U.S. PATENT DOCUMENTS

| | | | | |
|---|---|---|---|---|
| 5,327,560 A | * | 7/1994 | Hirata et al. | 395/700 |
| 5,469,573 A | * | 11/1995 | McGill, III et al. | 717/127 |
| 5,758,154 A | * | 5/1998 | Qureshi | 702/94 |
| 6,175,932 B1 | * | 1/2001 | Foote et al. | 714/9 |
| 6,256,635 B1 | * | 7/2001 | Arrouye et al. | 707/102 |

* cited by examiner

Primary Examiner—Thomas M. Heckler

(57) ABSTRACT

A method for restoring resources on a computer is provided. The method includes providing a configuration database including resource information, receiving a restoration request including a computer identifier associated with the computer, accessing the configuration database based on the computer identifier to identify a restorable resource associated with the computer, and providing the restorable resource to the computer. A computer system includes a computer and a configuration manager. The computer has a plurality of installed resources. The configuration manager is coupled to the computer and adapted to store a configuration database including resource information associated with the computer, receive a restoration request from the computer including a computer identifier associated with the computer, access the configuration database to identify a restorable resource based on the computer identifier associated with the computer, and provide the restorable resource to the computer.

38 Claims, 3 Drawing Sheets

100

| Identifier 110 | Resource 120 | Resource Location 130 | Version 140 | Security 150 |

Figure 2

METHOD AND APPARATUS FOR RESTORING COMPUTER RESOURCES

BACKGROUND OF THE INVENTION

1. Field of the Invention

This invention relates generally to computer systems, and, more particularly, to a method and apparatus for restoring computer resources.

2. Description of the Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. For example, a computer connected to a network may communicate with other computers that are also connected to the network. Furthermore, the computer network may be used to share data, peripherals, or any other resources that are made available on the network.

Generally, a server may function as a centralized point on the network. For example, using any of the network topologies discussed above, a plurality of client computers may be interconnected such that the server controls the movement of data across the network. Typically, the server may service requests from a plurality of client computers that are connected to the network. Some computer networks include a plurality of interconnected servers, each controlling their own group of client computers or being dedicated to performing a particular function on the network.

When a particular server or client computer on a network fails (e.g., due to a hard disk crash), time-consuming, manual actions are typically required to reinstate the prior operating environment of the failed device. For example, a new hard disk may be installed, followed by the installation of at least a basic operating system to make the computer operable. Then all of the resources on the computer are manually installed. These resources might include firmware, software, or operating system (OS) resources, including OS and device driver software (i.e., drivers). Finally, any previously applied upgrades must be located and applied. It is often the case where many or all of the computers that make up the clients and servers on a particular network have unique configurations. The constant and rapid change in the computer industry virtually ensures that computers added to the network at different times will have differing hardware and software configurations, and thus, different resources. Reinstalling the computer resources requires special technical expertise, and results in significant downtime of the particular computer or possibly the entire network (i.e., if the server is the failed device).

In some cases, the manufacturer of the computer system provide restoration CDs to facilitate restoration of a failed computer system to its initial purchased state. This technique has numerous disadvantages. First, it does not account for any configuration changes that took effect after the system was purchased. As a result the user would have to remember all of the changes, manually locate the files associated with the configuration change, and install the files. Additionally, numerous upgrades to the resources might have been completed to the computer system since its initial purpose. These upgrades would be undone by restoring the system to its factory-fresh state. Again, the user would have to remember and manually locate and install the upgraded resources.

The present invention is directed to overcoming, or at least reducing the effects of, one or more of the problems set forth above.

SUMMARY OF THE INVENTION

One aspect of the present invention is seen in a method for restoring resources on a computer. The method includes providing a configuration database including resource information, receiving a restoration request including a computer identifier associated with the computer, accessing the configuration database based on the computer identifier to identify a restorable resource associated with the computer, and providing the restorable resource to the computer.

Another aspect of the present invention is seen in a computer system including a computer and a configuration manager. The computer has a plurality of installed resources. The configuration manager is coupled to the computer and adapted to store a configuration database including resource information associated with the computer, receive a restoration request from the computer including a computer identifier associated with the computer, access the configuration database to identify a restorable resource based on the computer identifier associated with the computer, and provide the restorable resource to the computer.

BRIEF DESCRIPTION OF THE DRAWINGS

The invention may be understood by reference to the following description taken in conjunction with the accompanying drawings, in which like reference numerals identify like elements, and in which:

FIG. 2 is a diagram illustrating a configuration table maintained by the configuration manager of FIG. 1;

Figure 1:
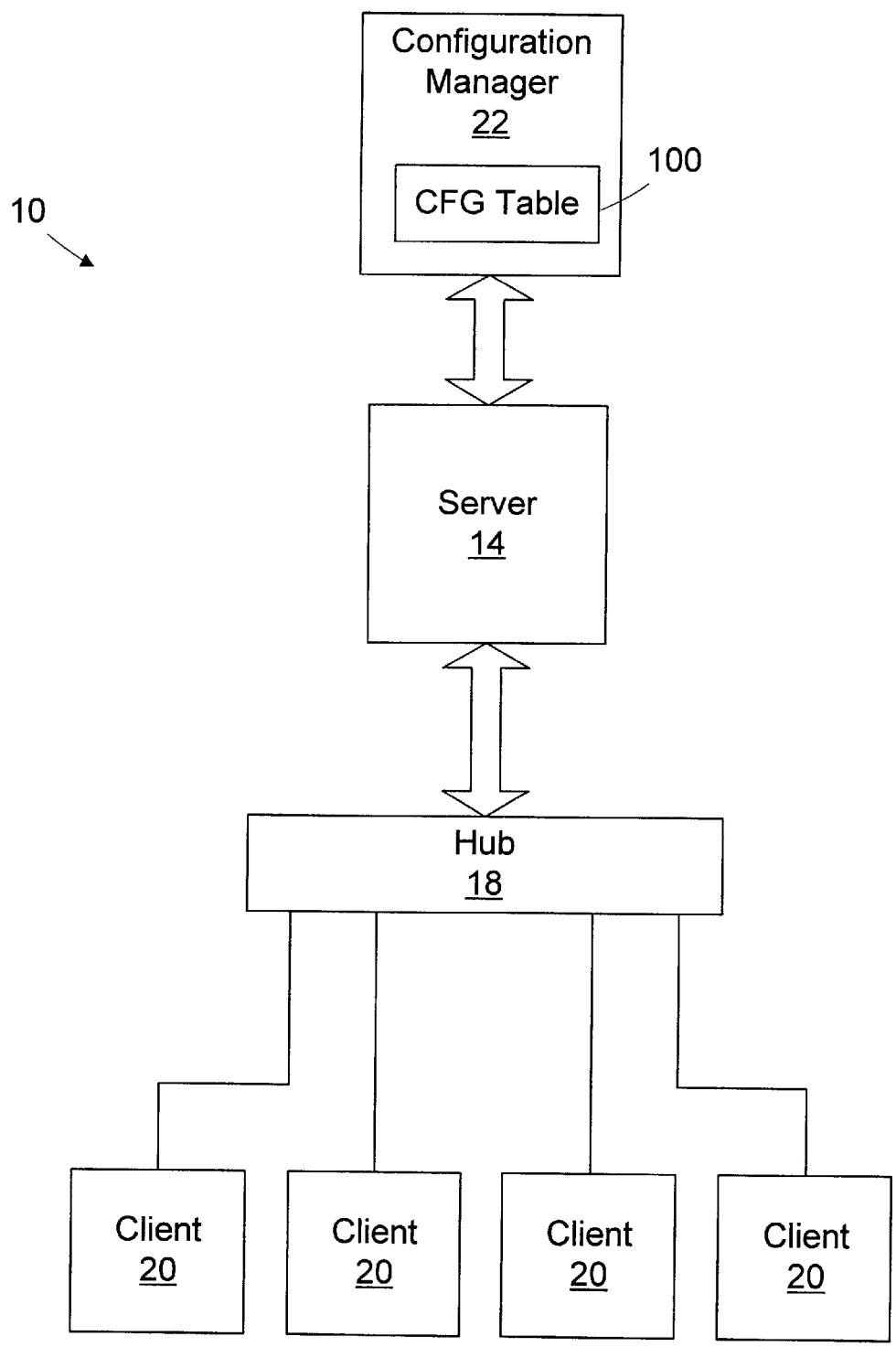
FIG. 1 is a simplified block diagram of a computer network having a server coupled to a plurality of clients and a configuration manager.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a computer network 10 is shown. The computer network 10 may be configured using a variety of known topologies. For example, the computer network 10 may be configured as a ring, bus, or any other known configuration for interconnecting computers. In one embodiment, the computer network 10 is configured using a star topology and comprises a server 14, a hub 18, and a plurality of clients 20 that are coupled to the hub 18. It is contemplated that the hub 18 may comprise a variety of conventional switching or routing devices, depending upon the particular application.

The hub 18 may be used as an intermediary between the server 14 and the clients 20. Generally, the hub 18 directs the flow of data between the server 14 and the clients 20. For example, each client 20 attached to the hub 18 may be identified by a unique address. Accordingly, based on the unique address, data may be routed from the server 14 to the appropriate client 20. Furthermore, the hub 18 may control the flow of data from the clients 20 to the server 14 (i.e., the hub 18 may be a bi-directional device.) Moreover, the hub 18 may operate in conjunction with the server 14 to transfer data between two clients 20. Although only one hub 18 is shown in FIG. 1, it is contemplated that a plurality of hubs 18 may be included in the computer network 10, which may increase the number of clients 20 that may be attached to the network 10. Additionally, a plurality of servers (not. shown) may be added to the computer network 10, each additional server (not shown) having its own group of clients to serve or functioning to provide a particular function for the network (e.g., internet access, printing services, e-mail services, etc.)

It is contemplated that a variety of protocols may be used to control the flow of data in the network 10. For example, the server 14 and the clients 20 may transfer data using TCP/IP, SNA, APPN, or any other protocol adapted to facilitate the movement of data. The clients 20 may be personal computers (PC). For example, the clients 20 may be IBM compatible PCs or Macintosh® computers. In addition to the client software, each client 20 may include an operating system, such as Windows® 95/98, Windows®, NT, MAC OS7/8, etc.

The server 14 and the clients 20 may have unique configurations of system resources, e.g., system firmware, software applications, operating systems (OS), OS drivers, and system partition utilities. Such system resources may be frequently upgraded by their respective manufacturers. However, not all of the computers 14, 20 on the network may have the same versions of the resources in effect. For example, an older client 20 may not have sufficient processing resources to operate efficiently using a newer vintage resource, and hence, the resource was not upgraded intentionally. Also, older versions of particular resources are sometimes selected to prevent undesirable interactions with other resources.

A configuration manager 22 is provided to track the particular configurations of the computers 14, 20 on the computer network 10. The configuration manager 22 may be incorporated into the server 14, it may be a stand-alone computer coupled as a client on the computer network 10, or it may be an external computer (i.e., as shown in FIG. 1) coupled to the computer network 10 through an external connection such as a modem connection or an internet connection. The configuration manager 22 maintains a configuration database 100 to track the installed resources on the computers 14, 20 in the computer network 10. Each computer 14, 20 in the computer network 10 has a unique identifier, such as a predefined address, a serial number, or any other unique identifier.

Turning to FIG. 2, a diagram of the configuration database 100 is provided. The configuration database 100 includes an identifier field 110 for storing the unique identifier of a particular computer 14, 20, a resource field 120 for storing the name of a particular resource installed on the computer (e.g., software application, firmware, driver), a resource location field 130 identifying the location of the resource (e.g., path and file name, internet address), a version field 140 identifying the version of the resource installed, and a security field 150 used for validating or authenticating a particular resource. The security field 150 may include one or more security keys. The present invention may be implemented with or without the security field 150, depending on the degree of security desired. Also, additional information may be stored in the configuration database Following a failure on one of the clients 20, the configuration manager 22 is accessed to determine the resources previously installed on the client 20. The configuration database 100 provides information for reconstituting the resources. Dependencies between various resources may also be stored in the configuration database 100. The particular resources are identified by name, and locations are used to indicate where they can be found. For example, the resource location field 130 may contain a link directly to a manufacturer's web site that includes the resource. Alternatively, the entire resource (e.g., software file) may be stored in a physical location (e.g., a hard disk drive) accessible to the configuration manager 22. The version field 140 specifies the appropriate version of the resource. The version field 140 may contain information such as the upgrade level of the resource. For example, a base resource may have been upgraded or patched from rev. 1 to rev. 2 to rev. 3. The upgrade level information stored in the version field 140 may allow the resource to be upgraded from the original resource to rev. 3 directly, without requiring the intermediate upgrades. The version field 140 may also specify what language (e.g., English, German, French, etc.) the version should be. The security field 150 may include a security key associated with the particular manufacturer so that the resource can be authenticated. It is possible for a resource to be corrupted or maliciously modified during transmission from the manufacturer to the entity restoring the resources on the client 20. A security scheme reduces the likelihood of such events.

The use of the security field 150 is described below as it may be implemented to provide authentication and/or privacy. A variety of security techniques are known in the art. An exemplary technique involves the use of public and private keys and hashes to create digital signatures. In public key cryptography systems, each user has two complementary keys, a publicly revealed key and a private key. Each key unlocks the code that the other key locks. Knowing the public key does not help you deduce the corresponding private key. The public key can be published and widely disseminated across a communications network. In the context of this application, a public key may be provided for the manufacturers of the resources. The manufacturer public key may be supplied by the configuration manager 22 and stored in the security field 150. The manufacturer public key is only useful to decrypt data that was encrypted with the manufacturer's corresponding private key.

Digital signatures are used to provide message authentication. The sender, for example a software vendor or system administrator, uses his own private key to encrypt a "hash" of the message thereby "signing" the message. A message digest is a cryptographically-strong, one-way hash function. It is somewhat analogous to a "checksum" or Cyclic Redundancy Check (CRC) error checking code, in that it compactly represents the message and is used to detect changes in the message. Unlike a CRC, however, it is computationally infeasible, if not virtually impossible, for an attacker to devise a substitute message that would produce an identical message digest. The message digest gets encrypted by the sender's private key, creating a digital signature of the message. Various digest standards have been proposed, such as Secure Hash Algorithm (SHA) or Message Digest 5 (MD5).

Although the following example described the use of a public/private key pair, any number of security key arrangements may be used. For example, a single secret key known to the user may be used. For example, the user may encrypt the registration data using a secret key and the configuration manager 22 may not be able to view the contents of the registration information.

In the context of this application, before installing a resource, the manufacturer's public key could be used by the computer 14, 20 to authenticate the resource by verifying the digital signature. This proves that the sender was the true originator of the message, and that the message has not been subsequently altered by anyone else, because the sender alone possesses the private key that made that digital signature. Forgery of a signed message is infeasible, and the sender cannot later repudiate his digital signature.

Additional security can be provided by combining the sender's (e.g., manufacturer or operator of the configuration manager 22) signature with a key associated with the operator of the computer network 10. For example, authentication can be provided by first signing a message with the sender's private key, then encrypting the signed message with the recipient's public key. The recipient reverses these steps by first decrypting the message with his own private key, then checking the enclosed digital signature with the sender's public key. In this way, the encrypted message cannot be read by anyone but the recipient, and it can only have been created by the sender.

A variant of a key management scheme involves sharing a "secret key" between the parties. The secret key is subsequently used for the creation, sharing, and refreshment of short-lived "session keys." In one exemplary embodiment, a session key is derived independently on both sides of the connection using the shared secret key and a random seed number. The session key is then exchanged between the parties. Messages going to the respective parties are then encrypted using their respective keys. This technique provides a low-overhead means for providing secure communications. The session key may be changed as frequently as desired.

In the context of the present invention, the security field 150 may contain both the manufacturer's public key and the public key of the operator of the computer network 10. The configuration manager 22 receives a signed resource (i.e., encrypted with the manufacturer's private key) from the manufacturer, encrypts the signed resource with the operator's public key, and transmits the manufacturer's public key and the encrypted signed resource to the operator. For example, the manufacturer's public key is combined in an archive with the signed resource and the archive is encrypted with the operator's public key. The operator then decrypts the archive with his private key, unlocks the manufacturer's public key, and uses the manufacturer's public key to authenticate the resource.

The degree of security desired may depend on the particular entity controlling the configuration manager 22. In one embodiment, the configuration manager 22 operates as a subscription service, where the operator of the computer network 10 registers all of the computers 14, 20 with a third party. Using a subscription service model, a user can be billed conveniently when requests are made to restore resources, when resources are registered, or both. Billing may be conducted based on the number of resources registered or the amount of space used. In a simple case, where the cost would be presumably less, just the resource names and locations would be stored. In another case, where the subscription fee would be higher, the actual resources could be stored. A price break may be given if a user registers multiple computers with the same installed resources. The third party subscription service continuously tracks and updates the locations of the resources and the manufacturer's public keys. When registering the computers 14, 20, the operator may encrypt the information sent to the configuration manager 22 with his private key to ensure that false records of the installed resources are not sent. In such an embodiment, where much of the traffic is not over secured lines (e.g., the internet), a higher degree of authentication may be desired. In another embodiment, the configuration manager 22 is part of the computer network 10 proper. In such a case authentication using the manufacturer's public key may be desired, while the secondary encryption with the operator's keys may be omitted. In still another embodiment, the configuration manager 22 is part of the computer network 10, and it maintains its own archive of resources. Due to the high degree of control, the security schemes may be entirely omitted.

Regardless of the level of security employed, the configuration manager 22 provides the functionality to quickly and easily restore the resources on the faulted computer 14, 20. The additional security features maintain the privacy of the configuration, the anonymity of the configuration, and the integrity of the configuration. Restoration or migration of the system configuration may be performed easily without requiring detailed knowledge from the user. The restoration of the resources may be performed remotely or locally. For example, the server 14 or the configuration manager 22 could boot (although not required) the failed client 20 remotely and place it in a known state. Alternatively, the server 14 or the configuration manager 22 could attempt to parse the physical disk, determine the logical data structures on the drive(s), attempt data recovery, and replace system files that were corrupt and/or inhibiting the local boot. This functionality is similar to removing the drive from the faulted computer 20, installing it into an operable system that can read the drive, retrieve/replace/repair the drive data, and then installing the drive back into the original system. However, using the technique described above, another machine would not be required to recover drive data.

Figure 3:
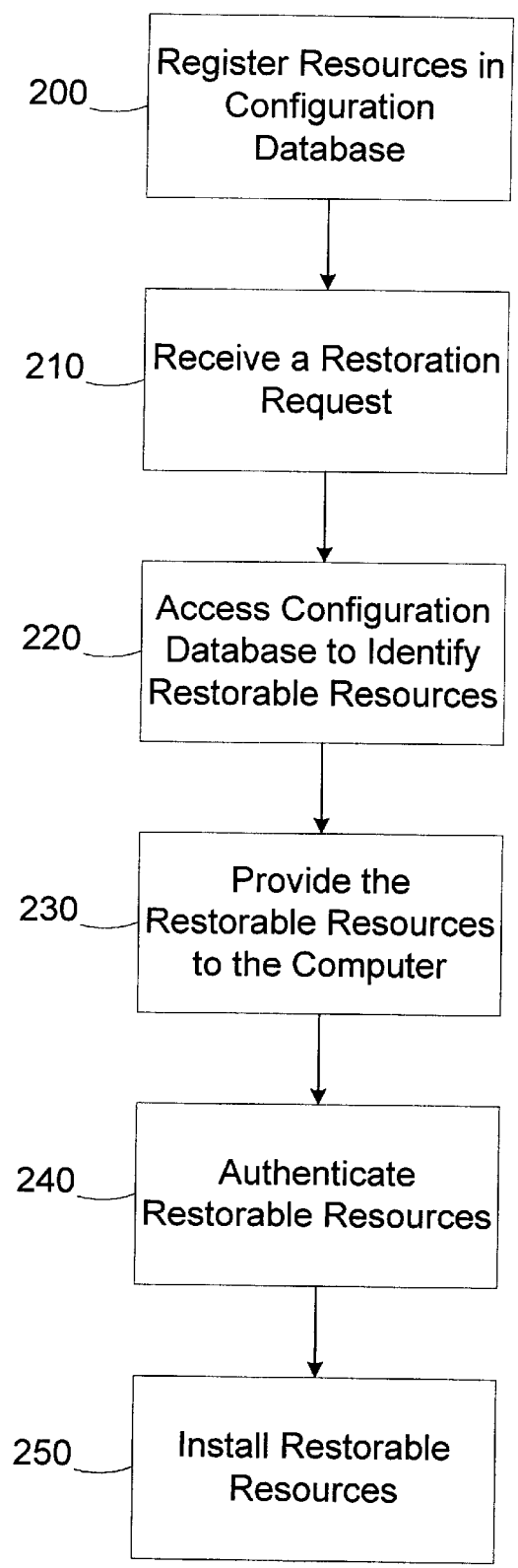
FIG. 3 is a flow chart illustrating a method for restoring computer resources in accordance with one embodiment of the present invention.

Turning now to FIG. 3, a method for restoring computer resources in accordance with the present invention is described. The method is described within the context of the computer network 10 provided in FIG. 1 and the configuration database 100 shown in FIG. 2. In block 200, resources on a particular computer (e.g., one of the clients 20) are registered in the configuration database 100. The registration process includes identifying each resource on a particular computer 20 to the configuration manager 22. The computer 20 being registered provides its unique identifier, the name of the resource, and the version of the resource to the configuration manager 22 for populating the identifier field 110, the resource field 120, and the version field 140, respectively. Encryption keys and/or digital signatures may be employed as described above if desired. The configuration manager 22 determines the information for the resource location field 130 and possibly the security field 150 (e.g., the manufacturer's public key).

As shown in block 210, in the event of a failure on the client 20, a restoration request including a computer identifier associated with the client 20 is received. The configuration database 100 is accessed, based on the computer identifier, to identify restorable resources associated with the client 20 in block 220. The restorable resources are provided to the client 20 in block 230. The resources may be provided directly by the configuration manager 22, or alternatively, the configuration manager may provide links to the manufacturer's internet sites where the resource can be found. Optionally, the resources received by the client 20 may be authenticated in block 240. The resources are installed on the client 22 in block 250 to restore its configuration.

The recovery functions of the configuration manager may be combined with automatic upgrading features, such as those described in U.S. Pat. No. 5,586,304, entitled "Automatic Computer Upgrading," and incorporated herein by reference in its entirety. The upgrading and/or recovery service may be provided on a subscription basis by a third party vendor. Because the configuration manager 22 acts as a gatekeeper for resource recovery it can track usage for billing purposes. Also, during recovery of a failed client 20, the upgrading functionality might be used to suggest resources that may have newer versions the operator might wish to install in lieu of the previous versions.

To further illustrate various embodiments of the present invention, several exemplary scenarios with different levels of security are described below. In a first example, the degree of authentication is light. System resources are registered with the configuration manager 22. During the registration process, licensed material information is provided and any software dependencies are defined. Providing licensing information protects against software piracy violations. Subsequently, when a restoration request is received, the user is validated (e.g., using a password) and the installation proceeds. A full or partial restoration may be requested.

In a second example, where a higher degree of security is desired, an identity key for the user is provided, and the registration information is encrypted using the identity key. The identity key is archived for future use in restoration. The identity key allows for maintaining the anonymity of the user. In response to receiving a restoration request, the user is validated using the stored identity key, and the full or partial restoration commences.

Finally, in a third example with an even higher degree of security, an identity key is provided by the configuration manager 22, and a user key is defined by the user. The registration information is encrypted or signed by the user with the user key and with the identity key. In this manner, the registration contents are not visible to the configuration manager 22 and billing may be specified based on the amount of space used. The user would have responsibility for the contents of the registration information. In another variant, the user key could be archived with the registration information and used by the configuration manager 22 to view the contents and generate a bill based on the applications or line items included.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer; and authenticating the restoration request.

2. A method for restoring resources on a computer, comprising:

providing a configuration database including resource information;

receiving a restoration request including a computer identifier associated with the computer;

accessing the configuration database based on the computer identifier to identify a restorable resource associated with the computer; and providing the restorable resource to the computer, wherein providing the restorable resource comprises providing an encrypted restorable resource.

3. The method of claim 2, wherein the encrypted restorable resource is encrypted with a private key, the method further comprising providing a public key corresponding to the private key to the computer.

4. The method of claim 3, further comprising:

decrypting the encrypted restorable resource using the public key; and installing the restorable resource on the computer.

5. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer; and encrypting the restorable resource with a public key associated with the computer.

6. The method of claim 5, further comprising:

decrypting the encrypted restorable resource using a private key corresponding to the public key; and installing the restorable resource on the computer.

7. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer; and billing a user based on the restoration request.

8. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer;

registering a plurality of installed resources associated with the computer in the configuration database; and billing a user based on the plurality of installed resources registered.

9. A method for restoring resources on a computer, comprising:

providing a configuration database including resource information;

receiving a restoration request including a computer identifier associated with the computer;

accessing the configuration database based on the computer identifier to identify a restorable resource associated with the computer; and providing the restorable resource to the computer, wherein providing the restorable resource comprises:
sharing a secret key with the computer;
encrypting a random number with the secret key;
generating a session key based on the secret key and the encrypted random number; and
providing the restorable resource using the session key.

10. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer;

registering a set of installed resources for a plurality of computers;

billing a user at a first rate for installed resources that are unique to one of the computers; and billing the user at a second rate, different than the first rate, for installed resources that are common to at least two of the computers.

11. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer;

registering a plurality of installed resources associated with the computer in the configuration database, wherein registering the plurality of installed resources includes at least one of providing an address for the installed resource and storing the installed resource;

billing a user at a first rate for installed resources that registered by providing the address for the installed resource; and billing the user at a second rate, different than the first rate, for installed resources that are registered by storing the installed resource.

12. A method for restoring resources on a computer, comprising:

providing a configuration database including resource information;

receiving a restoration request including a computer identifier associated with the computer;

accessing the configuration database based on the computer identifier to identify a restorable resource associated with the computer;

providing the restorable resource to the computer;

identifying an available upgrade for the restorable resource; and offering the upgrade of the restorable resource in lieu of the restorable resource.

13. A computer system, comprising:

a computer having a plurality of installed resources; and a configuration manager coupled to the computer to store a configuration database including resource information associated with the computer, receive a restoration request from the computer including a computer identifier associated with the computer, access the configuration database to identifier associated resource based on the computer identifier associated with the computer, and provide the restorable resource to the computer, and wherein the configuration manager authenticates the restoration request.

14. A computer system, comprising:

a computer having a plurality of installed resources; and a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer, and wherein the configuration manager provides an encrypted restorable resource.

15. The computer system of claim 14, wherein the encrypted restorable resource is encrypted with a private key, and the configuration manager provides a public key corresponding to the private key to the computer.

16. The computer system of claim 15, wherein the computer decrypts the encrypted restorable resource using the public key and install the restorable resource on the computer.

17. A computer system, comprising:

a computer having a plurality of installed resources;

a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer; and a server coupled to the computer to receive the restorable resource and install the restorable resource on the computer, wherein the configuration manager provides an encrypted restorable resource to the server, the encrypted restorable resource is encrypted with a private key, and the configuration manager provides a public key corresponding to the private key to the server.

18. The computer system of claim 17, wherein the server decrypts the encrypted restorable resource using the public key and install the restorable resource on the computer.

19. A computer system, comprising:
a computer having a plurality of installed resources; and
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer, and wherein the configuration manager encrypts the restorable resource with a public key associated with the computer.

20. The computer system of claim 19, wherein the computer decrypts the encrypted restorable resource using a private key corresponding to the public key and install the restorable resource.

21. A computer system, comprising:
a computer having a plurality of installed resources;
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer; and
a server coupled to the computer to receive the restorable resource and install the restorable resource on the computer,
wherein the configuration manager encrypts the restorable resource with a public key associated with the computer and wherein the server decrypts the encrypted restorable resource using a private key corresponding to the public key and install the restorable resource on the computer.

22. A computer system, comprising:
a computer having a plurality of installed resources; and
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer, and wherein the configuration manager stores billing information based on the restoration request.

23. A computer system, comprising:
a computer having a plurality of installed resources; and
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer;
wherein the computer registers a plurality of installed resources associated with the computer in the configuration database and wherein the configuration manager stores billing information based on the plurality of installed resources registered.

24. The computer system of claim 23, wherein the configuration manager stores billing information based on the plurality of installed resources registered.

25. A computer system, comprising:
a computer having a plurality of installed resources;
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer; and
a plurality of computers, each having installed resources registered in the configuration database,
wherein the configuration manager generates billing information using a first rate for installed resources that are unique to one of the computer and generates billing information using second rate, different than the first rate, for installed resources that are common to at least two of the computers.

26. A computer system, comprising:
a computer having a plurality of installed resources; and
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer,
wherein the computer registers a plurality of installed resources associated with the computer in the configuration database and, wherein the configuration manager provides the restorable resource by performing at least one of providing an address for the installed resource and providing a previously stored installed resource, and the configuration manager also generates billing Information using a first rate for installed resources that registered by providing the address for the Installed resource, and generates billing information using a second rate, different than the first rate, for installed resources that are registered by storing the installed resource.

27. A computer system, comprising:
a computer having a plurality of installed resources; and
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer, and wherein the configuration manager shares a secret key with the computer, encrypts a random number with the secret key, generates a session key based on the secret key and the encrypted random number, and provides the restorable resource using the session key.

28. A computer system, comprising:
a computer having a plurality of installed resources; and
a configuration manager coupled to the computer to store a configuration database including resource information associated with the computer, receive a restoration request from the computer including a computer identifier associated with the computer, access the configuration database to identify a restorable resource based on the computer identifier associated with the computer, and provide the restorable resource to the computer, and wherein the configuration manager identifies an available upgrade for the restorable resource and offer the upgrade of the restorable resource in lieu of the restorable resource.

29. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer;
providing the restorable resource to the computer; and
authenticating the restoration request.

30. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer; and
providing the restorable resource to the computer, wherein providing the restorable resource comprises providing an encrypted restorable resource.

31. The program storage device of claim 30, wherein the encrypted restorable resource is encrypted with a private key, and the method further comprises providing a public key corresponding to the private key to the computer.

32. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer;
providing the restorable resource to the computer; and
encrypting the restorable resource with a public key associated with the computer.

33. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer;
providing the restorable resource to the computer; and
generating billing information based on the restoration request.

34. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer;
providing the restorable resource to the computer; and
generating billing information based on the resource information in the configuration database.

35. A program storage device, comprising:
a configuration database including resource information, wherein the configuration database includes information related to installed resources on a plurality of computers;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer;
providing the restorable resource to the computer;
generating billing information using a first rate for installed resources that are unique to one of the computers; and
generating billing information using a second rate, different than the first rate, for installed resources that are common to at least two of the computers.

36. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer;
providing the restorable resource to the computer, wherein providing the restorable resource comprises at least one of providing an address for the restorable resource and providing a previously stored copy of the restorable resource;
generating billing information using a first rate for providing the address for the restorable resources; and
generating billing information at a second rate, different than the first rate, for providing the previously stored copy of the restorable resource.

37. A program storage device, comprising:
a configuration database including resource information;
program instructions, that when executed by a processing device perform a method for restoring a resource on a computer, the method comprising:
receiving a restoration request including a computer identifier associated with the computer;
accessing the configuration database based on the computer identifier to identify a restorable resource associated with the computer; and providing the restorable resource to the computer, wherein providing the restorable resource comprises:
    sharing a secret key with the computer;
    generating a session key based on the secret key and a random number; and
    providing the restorable resource using the session key.

38. A program storage device, comprising:

a configuration database including resource information;

program instructions, that when executed by a processing device perform a method for restoring a resource on a computer, the method comprising:

receiving a restoration request including a computer identifier associated with the computer;

accessing the configuration database based on the computer identifier to identify a restorable resource associated with the computer;

providing the restorable resource to the computer;

identifying an available upgrade for the restorable resource; and offering the upgrade of the restorable resource in lieu of the restorable resource.

\* \* \* \* \*